United States Patent
Lonkar

(10) Patent No.: US 8,610,739 B2
(45) Date of Patent: Dec. 17, 2013

(54) GRAPHICS PROCESSING UNIT BASED COLOR MANAGEMENT OF OUTPUT DEVICES

(75) Inventor: Amruta S Lonkar, Pune (IN)

(73) Assignee: NVIDIA Corporation, Santa Clara, CA (US)

( * ) Notice: Subject to any disclaimer, the term of this patent is extended or adjusted under 35 U.S.C. 154(b) by 775 days.

(21) Appl. No.: 12/758,050

(22) Filed: Apr. 12, 2010

(65) Prior Publication Data

US 2011/0249015 A1 Oct. 13, 2011

(51) Int. Cl.
*G09G 5/02* (2006.01)

(52) U.S. Cl.
USPC ........... 345/590; 345/589; 345/594; 345/619; 345/2.1; 345/2.2; 345/520

(58) Field of Classification Search
None
See application file for complete search history.

(56) References Cited

U.S. PATENT DOCUMENTS

2010/0321395 A1* 12/2010 Maciesowicz et al. ....... 345/502

* cited by examiner

*Primary Examiner* — Antonio A Caschera
(74) *Attorney, Agent, or Firm* — Raj Abhyanker, P.C.

(57) ABSTRACT

A method includes querying a database to determine the color profile of the multimedia content. The method may include comparing the secondary color profile of the secondary display to the primary color profile of the primary display and then determining a secondary color profile to apply to the multimedia content on the secondary display. The method may include selecting the secondary color profile from a database and applying the secondary color profile to the multimedia content. The method includes displaying the multimedia content with the secondary color profile on secondary display to reduce a color discrepancy of the multimedia content between the primary and the secondary display.

9 Claims, 8 Drawing Sheets

GRAPHICS PROCESSING UNIT BASED COLOR MANAGEMENT OF OUTPUT DEVICES

FIELD OF TECHNOLOGY

This disclosure relates generally to color balancing and, more particularly, to graphics processing unit based color management of output devices.

BACKGROUND

Resolving color consistency problems may require obtaining a color profile of the device (e.g. from a manufacturer or a color consortium body) and applying the color profile to the multimedia content. Obtaining and applying color profiles of the devices with the multimedia content may be time consuming and tedious, because a different color profile may need to be obtained and applied for each device displaying the multimedia content.

Additionally, the company may utilize multiple displays for a particular project. For example, multiple users may each use a different display to collaborate on the same project (e.g. an animated film). It may be important for the colors of the project to be displayed consistently among all of the displays to ensure a quality work product. Without color consistency, when each user is editing and creating content related to the project, each user may not be able to create content consistent with the content created by a previous user on a different display.

To achieve color consistency among the different displays, each display may need to be manually adjusted. Manually adjusting each display may be time consuming and tedious, because the user may have to visually compare the project on his display to the project on the original display using human visual perception. As a result, there may be an inefficient use of time. Time that could have been used for project development may be needed for display adjustment.

SUMMARY

Disclosed are a method, an apparatus and/or a system of graphics processing unit based color management for output devices.

In one aspect, a method includes determining a secondary color profile to apply to the multimedia content on the secondary display. The method may include comparing the secondary color profile of the secondary display to the primary color profile of the primary display. The method furthermore includes querying a database of the secondary color profile to determine the color profile of the multimedia content. The method furthermore includes applying the secondary color profile of the database to the multimedia content. The method furthermore includes displaying the multimedia content with the secondary color profile on the secondary display, wherein the multimedia content on the secondary display with secondary color profile is a match with the multimedia content on a primary display with a primary color profile. The method furthermore includes reducing a color discrepancy between the multimedia content of the primary display and the multimedia content of the secondary display.

In another aspect, a method includes displaying an image on a primary display. The primary display may include a primary color profile. The method also includes displaying the image on a secondary display. The secondary display may have a default color profile. The method further includes determining, through a processor, a secondary color profile. The secondary color profile adjusts the secondary display to display a color of the image on the first display the same as the color of the image on the second display. The method furthermore includes determining, on a processor, a type of a connector of a secondary display. The method furthermore includes determining an extended display identification data of the secondary display based on the type of the connector. The method furthermore includes selecting the secondary color profile from a database based on the extended display identification data. The method furthermore includes replacing the default color profile of the secondary display with the secondary color profile. The method furthermore includes reducing a difference of the color between the color of the image of the primary display with the primary color profile and the color of the image of the secondary display with the default color profile.

In yet another aspect, the system includes a graphics processing unit to determine a type of a connector of a secondary display. The system also includes a connector to connect the graphics processing unit to the secondary display. The system further includes a primary display to display a multimedia content with a primary color profile. The system furthermore includes a secondary display to display the multimedia content with a secondary color profile. The system furthermore includes a driver to maintain a database of the primary color profile and the secondary color profile.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method and/or a system of color management for output devices through a graphic processing unit (GPU). Although the present embodiments have been described with reference to specific example embodiments, it will be evident that various modifications and changes may be made to these embodiments without departing from the broader spirit and scope of the various embodiments.

Figure 1:
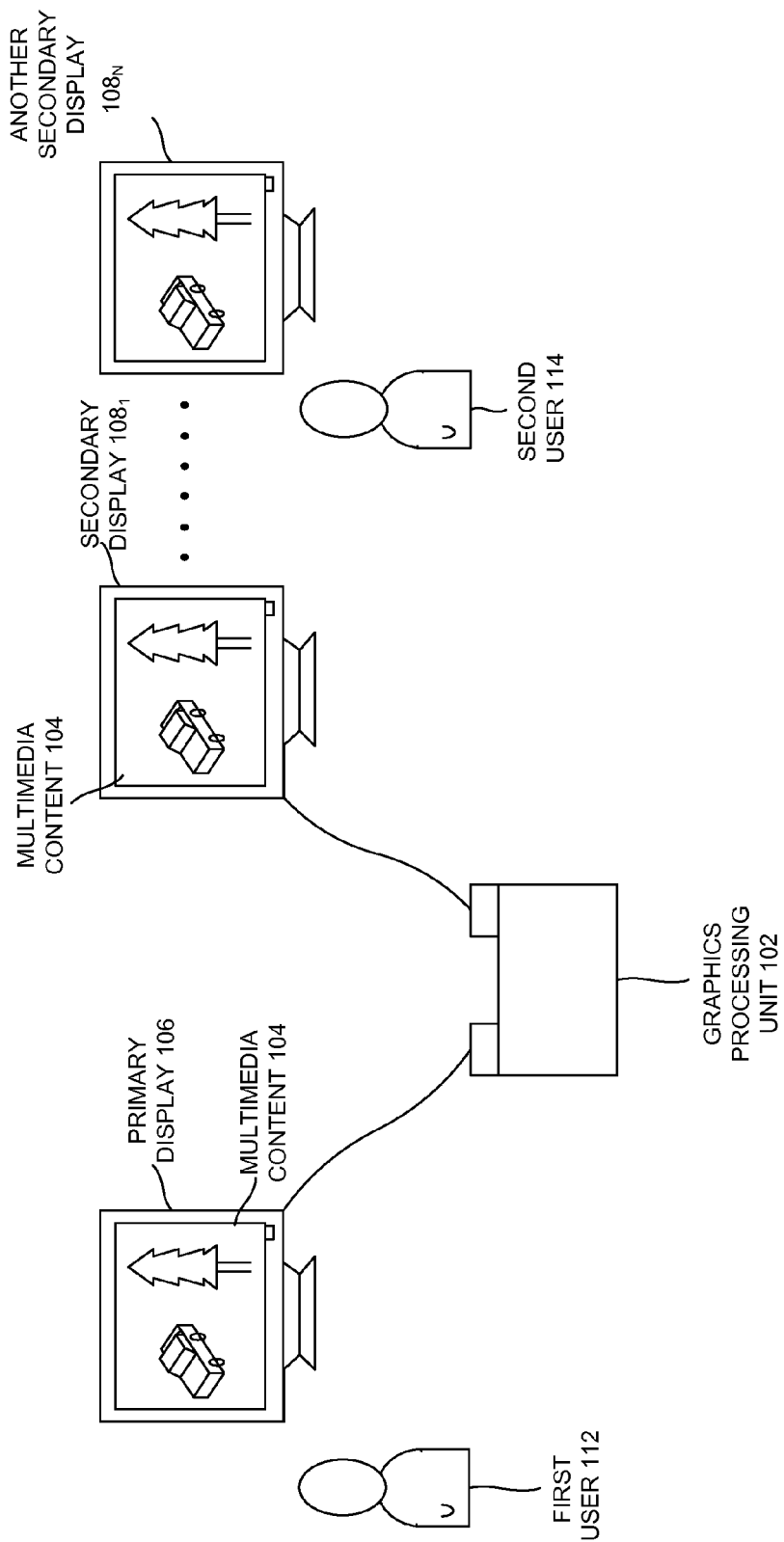
FIG. 1 is a schematic view of an example scenario of color management for one or more output devices through a graphics processing unit (GPU), in accordance with one or more embodiments.

FIG. 1 is a schematic view of an example scenario of color management for one or more output devices through a GPU 102, in accordance with one or more embodiments. The output devices (e.g., a primary display 106, a secondary display $108_1$) may include, for example a printer device, a display screen, a monitor, a projector screen, and the like. In the example scenario, the GPU 102 may be operatively coupled to the primary display 106 and the secondary display $108_1$. The GPU 102 may be configured to remove one or more discrepancies, for example a color discrepancy, between a display of a multimedia content 104 on the primary display 106 and the display of the multimedia content 104 on one or more secondary displays (e.g., the secondary display $108_1$), such that the primary display 106 viewed by a first user 112 appears similar to the secondary display $108_1$ viewed by a second user 114 without any discrepancies therein. For example, an image should appear similar in terms of color and/or one or more other display parameters (e.g., resolution) when viewed on a computer display screen and a plasma television screen.

In one or more embodiments, the GPU 102 may also be configured to remove one or more discrepancies between the secondary display $108_1$ and another secondary display $108_N$. In order to remove the discrepancies, the GPU 102 may determine a type of connector of the secondary display $108_1$ and then may determine an extended display identification data (EDID) of the secondary display $108_1$ based on the type of the connector. The GPU 102 may determine a secondary color profile to apply to the multimedia content based on the determined EDID in real time.

In one or more embodiments, if the type of the connector is such that the EDID cannot be read by the GPU 102 (e.g., an analog television connector), then the GPU 102 may receive one or more inputs from a user interface coupled to the GPU 102 and may determine the secondary profile based on the received inputs. In one or more embodiments, the received inputs may be manual inputs received from a user. In one or more embodiments, the received inputs may override selection of the secondary color profile by the GPU 102. In one or more embodiments, the GPU 102 may apply the selected secondary color profile to the multimedia content in the secondary display $108_1$ in real time. Further, the GPU 102 may match the secondary color profile with a primary color profile of the multimedia content in the primary display 106 so as to reduce the color discrepancy and may display the multimedia content with the secondary color profile on the secondary display 108 to the second user 114. Similarly the GPU 102 may be configured to reduce color discrepancy between the multimedia content in the secondary display $108_1$ and another secondary display $108_N$.

Figure 2:
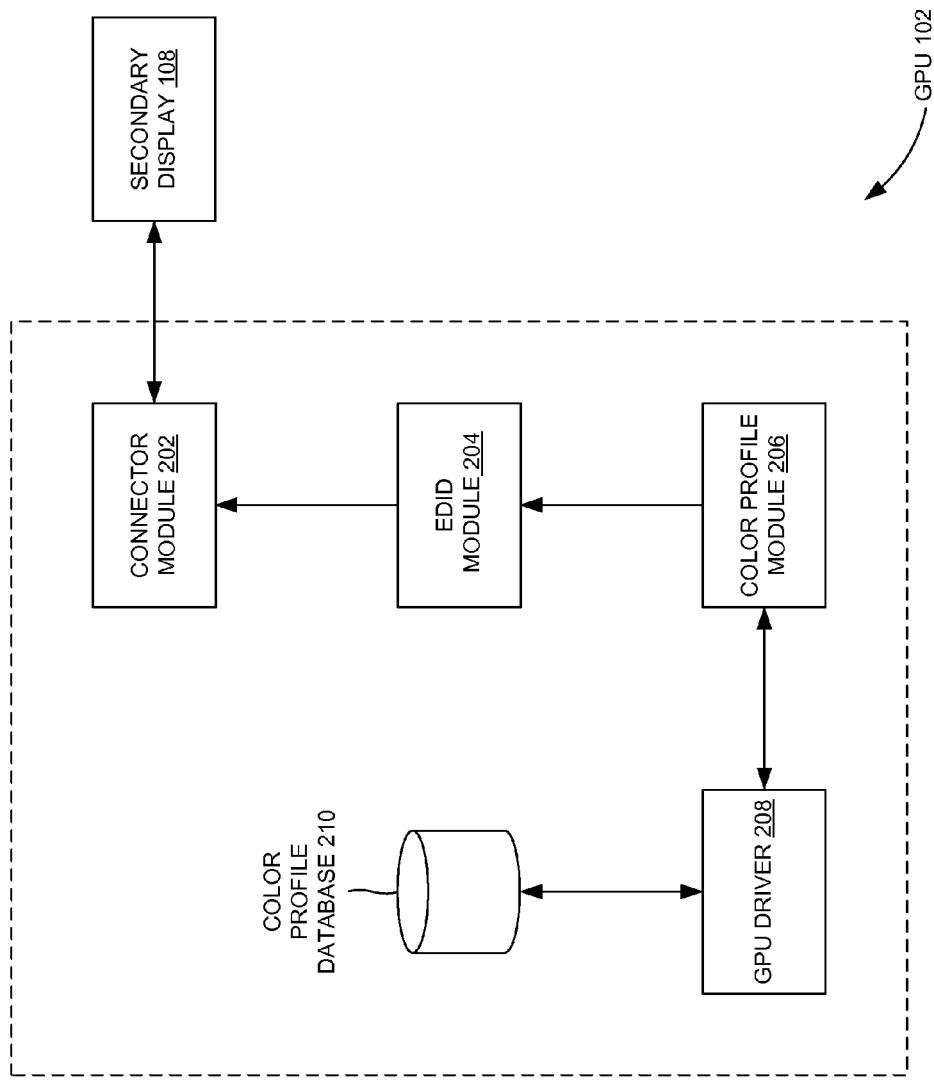
FIG. 2 is a schematic view of a GPU operatively coupled to a secondary display, in accordance with one or more embodiments.

FIG. 2 is a schematic view of a GPU 102 operatively coupled to a secondary display 108, in accordance with one or more embodiments. In one or more embodiments the GPU 102 may include a connector module 202. The connector module 202 may be configured to determine through a processor (e.g. a central processing unit (CPU), or the GPU 102) a type of connector of the secondary display 108. The type of connector may be, for example, a video graphics array, a digital visual interface, a high-definition multimedia interface, a display port, a separate video (s-video), a composite video, or a component video. In one or more embodiments, the GPU may also include an extended display identification data (EDID) module. The EDID module may be configured to determine the EDID of the secondary display based on the type of the connector determined by the connector module. If the type of the connector is for example, one of a video graphics array, a digital visual interface, a high-definition multimedia interface, or a display port, then the EDID module may be able to determine the EDID of secondary display.

The GPU 102 may determine a secondary color profile for a multimedia content (e.g., multimedia content 104) to be displayed on the secondary display 108 based on the determined EDID. In one or more embodiments, the GPU may include a color profile module 206 configured to determine the secondary color profile to apply to the multimedia content on the secondary display 108. The secondary color profile may be a device dependent profile or a device independent profile. The device independent profile may be a profile based on an international color standard (e.g., International Color Consortium®). In one or more embodiments, the secondary color profile may be of an extensible markup language format. The color profile module 206 may be configured to query a color profile database 210 of a GPU driver 208 to select the secondary color profile for the multimedia content from among one or more secondary color profiles in the color profile database 210. In one or more embodiments, the color profile module 206, selects the secondary color profile such that the multimedia content displayed on the secondary display 108 (e.g., a digital television screen) is a match with the multimedia content displayed on a primary display (a computer monitor) with a primary color profile.

On the contrary, if the type of the connector is for example, one of a separate video (s-video), a composite video, or a component video, then the EDID module 204 may fail to determine the EDID of the secondary display 108. If the EDID module 204 fails to determine the EDID of the secondary display 108, the secondary color profile may be selected based on one or more inputs received through a user interface (not shown). The user interface may be operatively couple to the GPU 102. In one or more embodiments, the color profile module 206 may be configured to apply the selected secondary color profile to the multimedia content. The GPU 102 may render the multimedia content with the applied secondary color profile on the secondary display 108, while reducing discrepancy between the multimedia content on the primary display and the multimedia content on the secondary display 108.

Figure 3:
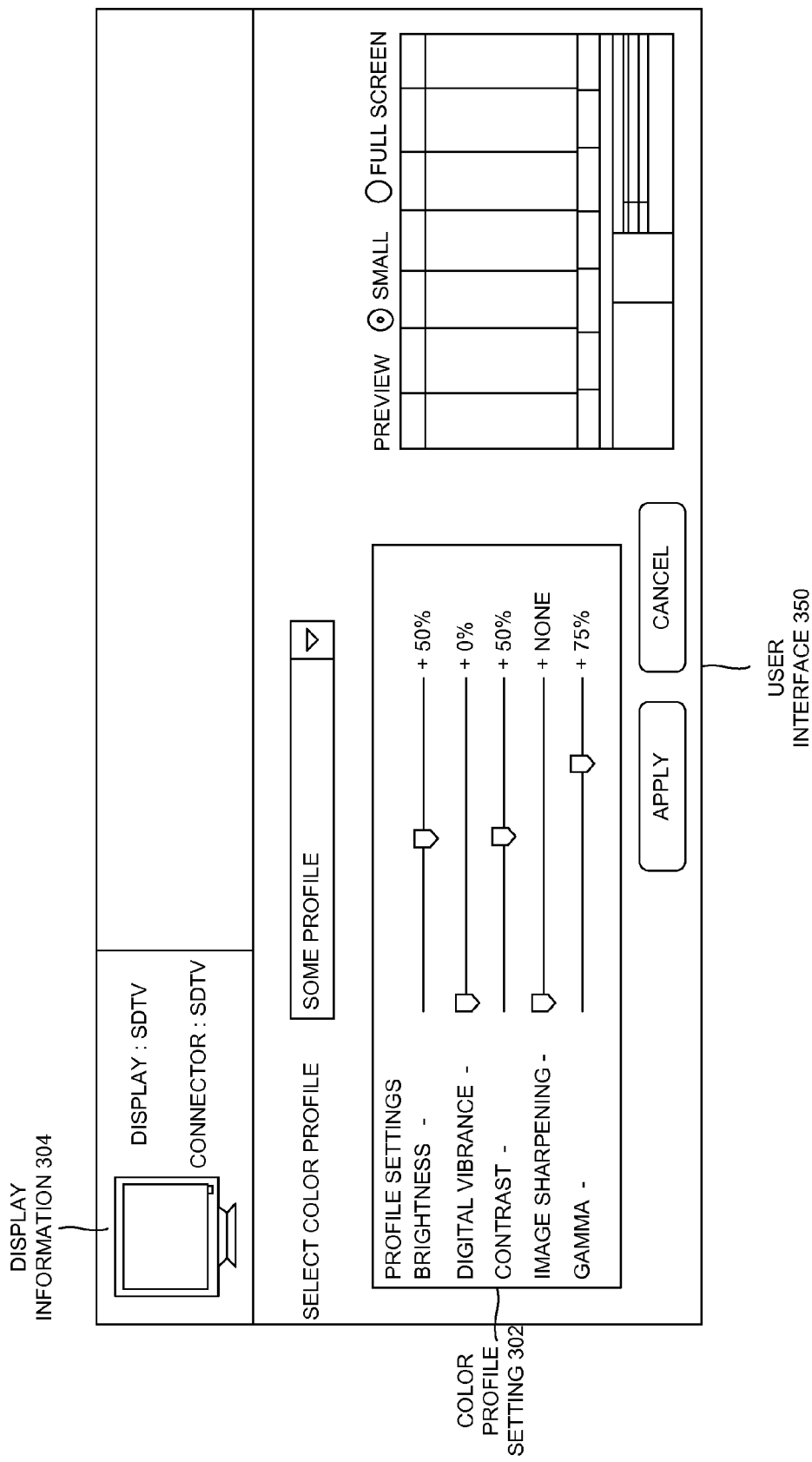
FIG. 3 is a schematic view of a user interface coupled to a GPU, in accordance with one or more embodiments.

FIG. 3 is a schematic view of a user interface 350 coupled to the GPU 102, in accordance with one or more embodiments. The user interface 350 may be configured to receive one or more inputs from a user to override a selected secondary color profile in the GPU 102. The user interface 350 may allow overriding of the selected secondary color profile when a default color profile is preferred over the secondary color profile. In one or more embodiments, as illustrated in FIG. 3, the user interface 350 may include display information 304 (e.g., display SDTV, connector: SDTV). The user interface 350 may render color profile settings 302. The color profile settings 302 may include, for example, one or more scroll bars to adjust one or more display parameters, for example, brightness, digital vibration, contrast, image sharpening, gamma, resolution, and the like. The user interface 350 may allow a user to select from one or more default color profiles, and/or adjust the color profile using the color profile settings. The user interface 350 may also provide a preview of the selected color profile as illustrated in FIG. 3.

Figure 4:
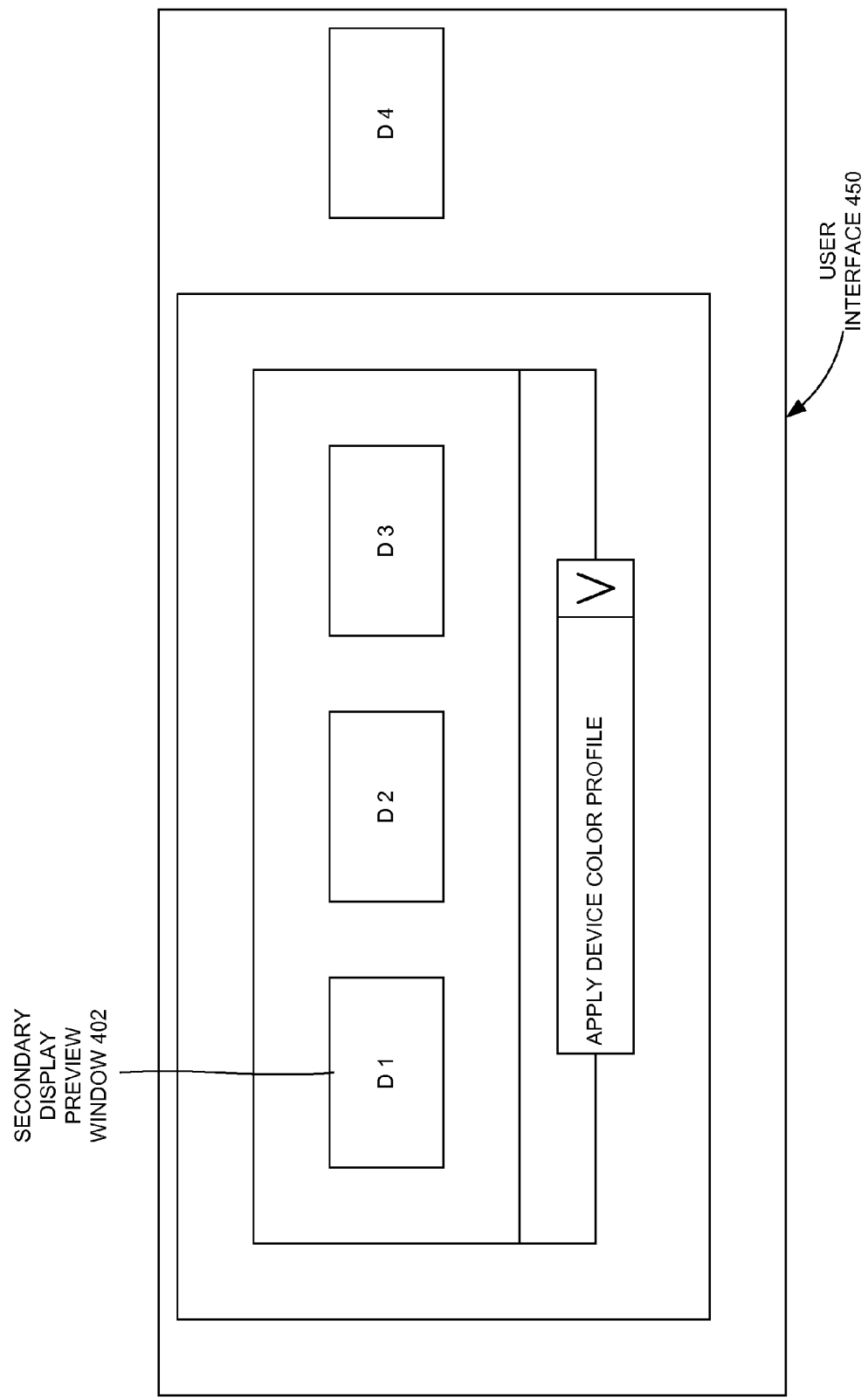
FIG. 4 is a schematic view illustrating bulk application of color profiles through a user interface coupled to a GPU, in accordance with one or more embodiments.

FIG. 4 is a schematic view illustrating bulk application of color profiles through a user interface 450 coupled to a GPU 102, in accordance with one or more embodiments. In one or more embodiments, a user may be allowed to select multiple input/output devices (e.g., devices D1, D2, D3, and D4) to apply a common color profile. In one or more embodiments the user may also be allowed to group one or more output devices into one or more groups, and may be allowed to apply different color profiles to each of the groups. As illustrated in the user interface 450 of FIG. 4, the devices D1, D2, and D3 may be selected and a color profile may be selected from a drop down menu (e.g., "apply device color profile") to apply the selected color profile to the selected devices D1, D2, and D3, simultaneously in real time.

The device selections and/or the selected color profile may be previewed in a secondary display preview window 402 of the user interface 450 as illustrated in FIG. 4. The GPU may apply the selected common color profile to the selected output devices (e.g., devices D1, D2, and D3) to display a multimedia content with the selected common color profile in the selected devices. For example, a user may be allowed to group a digital television and a computer monitor and select a common brightness level for an image displayed in either of the digital television and the computer monitor. In one or more embodiments, the selected common color profiles may override one or more secondary color profiles selected by the GPU 102.

Figure 5:
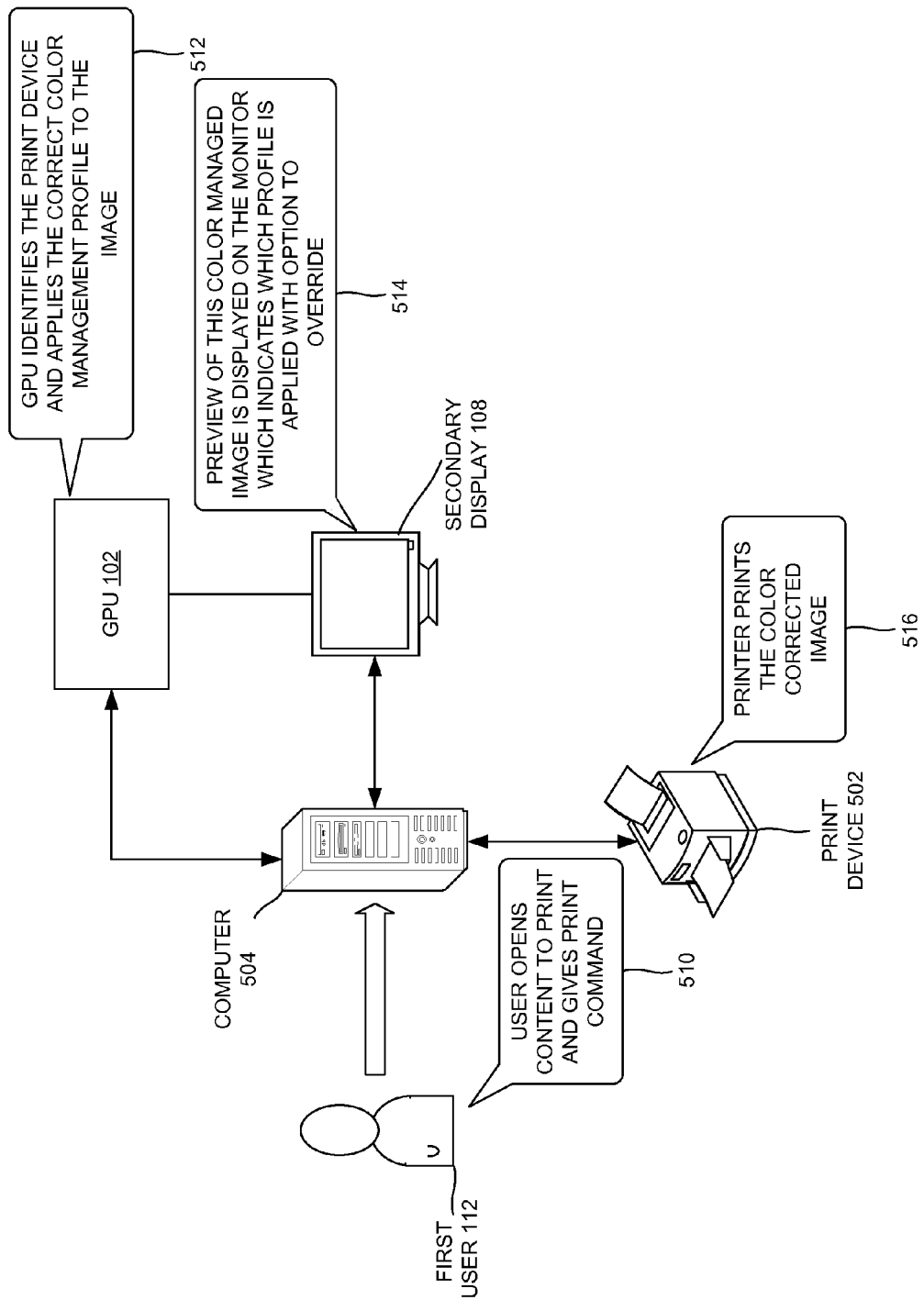
FIG. 5 is a schematic view of an example scenario of color management for a printer device through a GPU, in accordance with one or more embodiments.

FIG. 5 is a schematic view of an example scenario of color management for a printer device 502 through a GPU 102, in accordance with one or more embodiments. In one or more embodiments, at step 510, a first user 112 of the printer device 502 may open a document to be printed and may provide a print command. At step 512, the GPU 102 coupled to a computer 504 of the first user 112 may identify the printer device 502 to determine a color profile for print of the document. The GPU may then query a color profile database through a GPU driver 208 to determine the color profile to be applied to the document. The GPU may then apply the determined color profile to the document to be printed and/or may generate a preview of a color corrected image of the document with the applied color profile. At step 514, the preview of the color corrected image may be displayed on a secondary display 108 (e.g., monitor) indicating the color profile applied to the document with an option to override the applied color profile.

The first user 112 may either accept the applied color profile or may choose to select from one or more default color profiles through a user interface coupled to the GPU 102. In one or more embodiments, the determination of the secondary color profile may be overridden based on a preview of the multimedia content with the secondary color profile on the secondary display. The first user 112 may select the default color profile to be applied to the document and the selected default color profile may be applied to the document. Once the user accepts the applied color profile, at step 516, the printer device 502 may print the color corrected image of the document.

Figure 6:
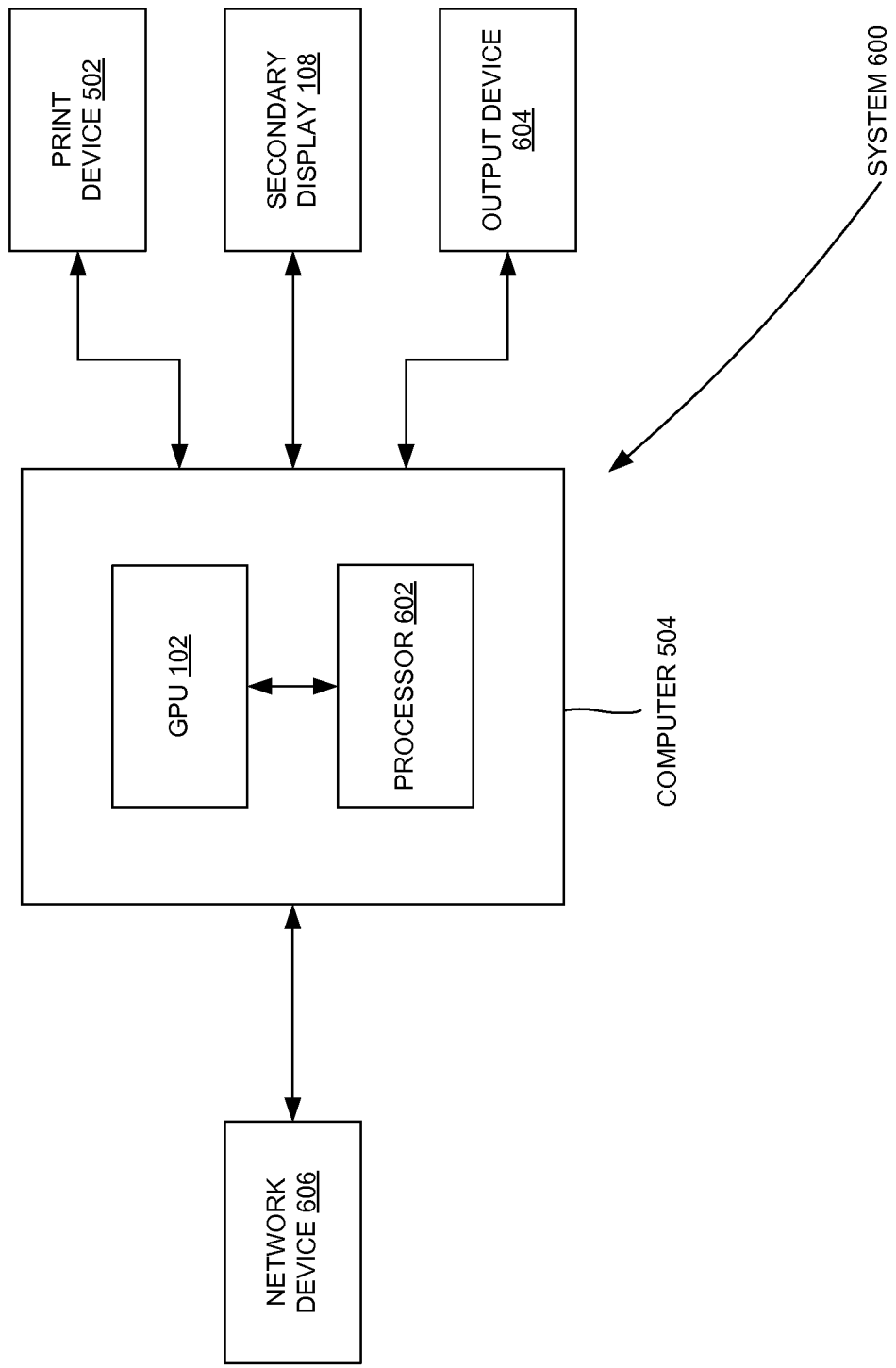
FIG. 6 is a schematic view of a system of color management for one or more input/output devices through a GPU, in accordance with one or more embodiments.

FIG. 6 is a schematic view of a system 600 of color management for one or more output devices through a GPU 102, in accordance with one or more embodiments. In one or more embodiments, the system may include a computer 504 including a processor 602 coupled to the GPU 102. The monitor of the computer 504 may constitute a primary display 106 and the computer 504 may be coupled to a secondary display 108. The secondary display 108 may be configured to display a preview of a multimedia content. The GPU 102 may be operatively coupled to the secondary display 108 through a connector (e.g., an interface). In one or more embodiments, the GPU 102 may be configured to determine the type of connector of the secondary display 108. The type of connector may include but is not limited to, a video graphics array, a digital visual interface, a high-definition multimedia interface, a display port, a separate video (s-video), a composite video, or a component video. In one or more embodiments, the GPU 102 may also be configured to determine an EDID data of the secondary display based on the type of the connector.

The GPU 102 may further be configured to determine a color profile for the multimedia content in real time. In one or more embodiments, the system 600 may also include a driver (e.g., GPU driver 208). The driver may be coupled to the GPU 102 and may be configured to maintain a database of one or more primary color profiles and/or one or more secondary color profiles. In one or more embodiments, a color profile module 206 within the GPU may be configured to select the secondary color profile from the database. In one or more embodiments, the GPU 102 may be enabled with a user interface (not shown) to receive one or more inputs to determine the secondary color profile based on the inputs. The inputs may include one or more selections from among one or more default color profiles rendered through the user interface to a user. The selections made by the user through the user interface may override selection of the secondary color profile through the GPU 102. For example, the user may view a scroll bar on the user interface allowing the user to adjust brightness of the display.

The user may adjust the scroll bar to a suitable position to select a particular extent of brightness. The selection of the extent of brightness by the user may override an extent of brightness specified in the secondary color profile selected by the GPU 102. The GPU may also be configured to apply the secondary color profile to the multimedia content of the secondary display 108 such that the multimedia content on the secondary display 108 matches with the multimedia content on a primary display with the primary color profile. In one or more embodiments, the printer device 502 may be associated with the output device 604. In one or more embodiments, the output devices (e.g., a print device 502) may be configured to reproduce the multimedia content into a tangible form with the secondary color profile.

Figure 7:
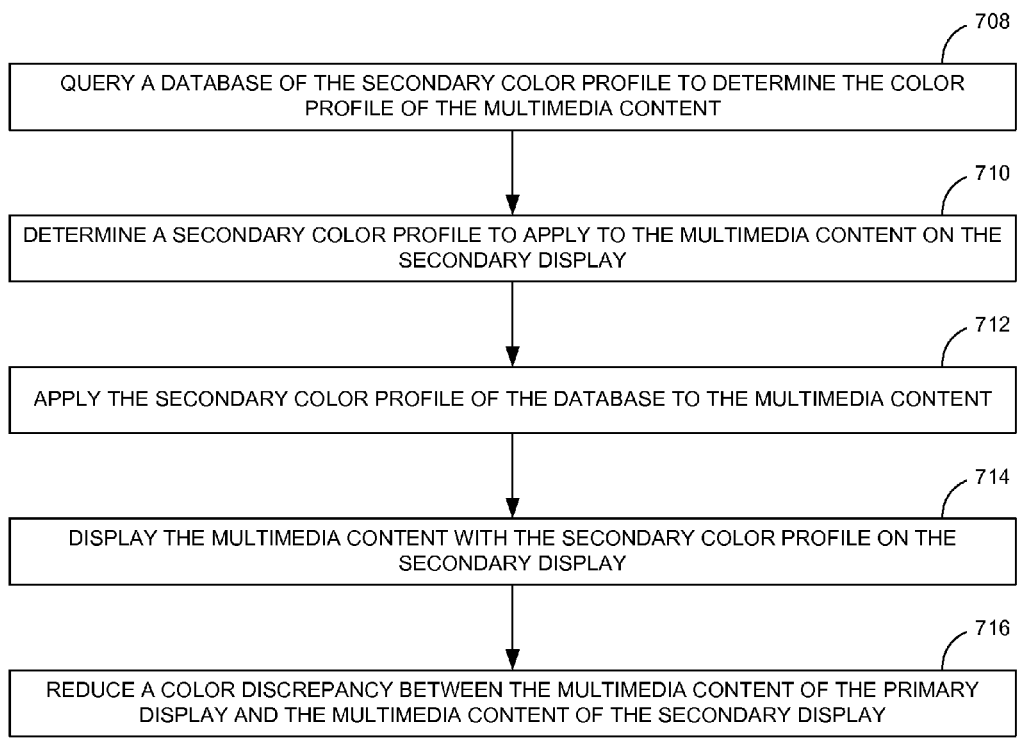
FIG. 7 shows a process flow diagram detailing the operations involved in a method of color management for output devices via a GPU, in accordance with one or more embodiments.

FIG. 7 shows a process flow diagram detailing the operations involved in a method of color management for output devices via graphics processing unit (GPU), in accordance with one or more embodiments. In one or more embodiments, operation 708 may involve querying a database of the secondary color profile to determine the secondary color profile of the multimedia content. In one or more embodiments, operation 710 may involve determining a secondary color profile to apply to the multimedia content on the secondary display. In one or more embodiments, the database of a driver of a graphics processing unit may be queried to determine the secondary color profile. The secondary color profile may be a device dependent profile and/or a device independent profile. The device independent profile may be a profile based on an international color standard. In one or more embodiments, the secondary color profile may be selected based on the type of the connector. In one or more embodiments, the secondary color profile may be of an extensible markup language format. In one or more embodiments, a color profile module within the GPU may determine the secondary color profile of the secondary display.

In one or more embodiments, if the type of the connector is one of a separate video (s-video), a composite video, or a component video, the EDID module may fail to determine the EDID. The GPU may not be able to determine the secondary color profile based on the EDID and the GPU may be enabled with a user interface to receive one or more inputs to determine the secondary color profile based on the inputs. The processor (e.g., CPU, GPU) in response to the user interface may adjust an image quality of the multimedia content based on the determined secondary color profile. In one or more embodiments, operation 712 may involve applying the secondary color profile of the database to the multimedia content. In one or more embodiments, operation 714 may involve displaying the multimedia content with the secondary color profile on the secondary display, wherein the multimedia content on the secondary display with secondary color profile is a match with the multimedia content on a primary display with a primary color profile.

In one or more embodiments, operation 716 may involve reducing a color discrepancy between the multimedia content of the primary display and the multimedia content of the secondary display. Further, in one or more embodiments, a type of a connector of another secondary display may be determined through the processor. An extended display identification data of another secondary display may be determined based on the type of the connector. Another secondary color profile may be determined to apply to the multimedia content on another secondary display. The secondary color profile may be selected to apply to the secondary device. Another secondary color profile may be selected to apply to another secondary device. The database of the secondary color profile and another secondary color profile may be generated.

The multimedia content may be displayed with another secondary color profile on another secondary display and the secondary color profile, simultaneously. The color discrepancy may be reduced between the multimedia content with the secondary color profile on a secondary display and the multimedia content with another secondary color profile on another secondary display. In one or more embodiments, the determination of another secondary color profile may be overridden when a default color profile is preferred over the secondary color profile.

The multimedia content may be displayed with a default color profile on another secondary display. The secondary color profile of the multimedia content may be applied to the secondary device and another secondary device, simultaneously, through a processor, in response to a selection of the user interface. A resolution of the secondary device may be adjusted. In one or more embodiments, a print device may be identified. The secondary color profile may be determined based on the print device. The secondary color profile may be applied to the multimedia content on the secondary display. The multimedia content may be displayed with the secondary color profile on the secondary display. The multimedia content may be printed with the secondary color profile on the print device.

Figure 8:
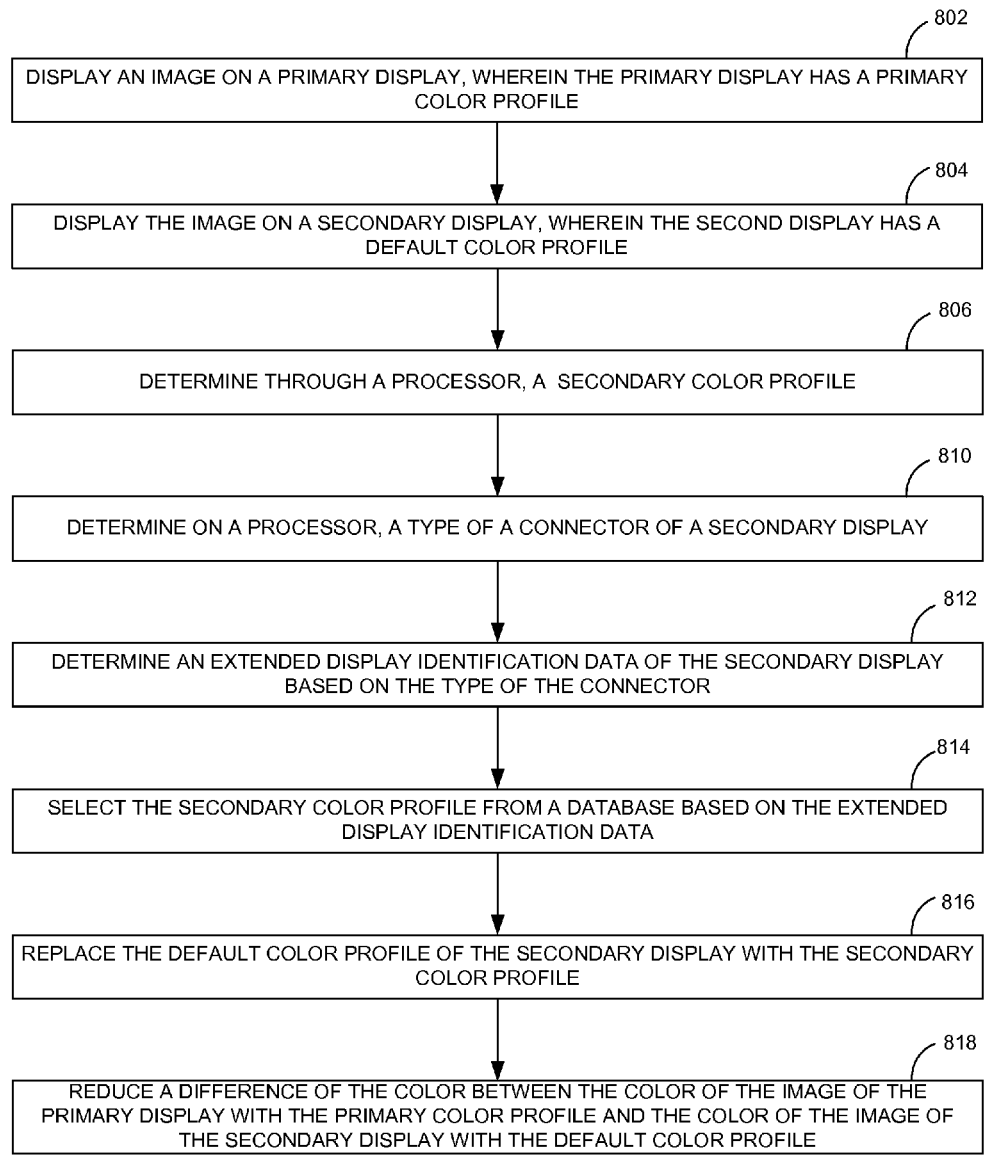
FIG. 8 shows a process flow diagram detailing the operations involved in a method of color management of an image in one or more output devices via a GPU, in accordance with one or more embodiments.

FIG. 8 shows a process flow diagram detailing the operations involved in a method of color management for an image in one or more output devices via graphics processing unit (GPU), in accordance with one or more embodiments. In one or more embodiments, operation 802 may involve displaying the image on a primary display. The primary display may have a primary color profile. In one or more embodiments, operation 804 may involve displaying the image on a secondary display, the second display having a default color profile. In one or more embodiments, operation 806 may involve determining, through a processor (e.g., CPU, GPU), a secondary color profile. The secondary color profile may be determined by querying the database of a driver of the GPU. The secondary color profile may be a device dependent profile or a device independent profile. The device independent profile may be a profile based on an international color standard.

The secondary color profile may adjust the secondary display to display the image on the primary display the same as the image on the secondary display without any discrepancy therein in terms of color and/or other display parameters (e.g., resolution). In one or more embodiments, operation 810 may involve determining, on a processor, a type of a connector of the secondary display. The type of connector may be, for example, a video graphics array, a digital visual interface, a high-definition multimedia interface, a display port, a separate video (s-video), a composite video, or a component video. In one or more embodiments, operation 812 may involve determining an extended display identification data of the secondary display based on the type of the connector. In one or more embodiments, operation 814 may involve selecting the secondary color profile from a database based on the extended display identification data. In one or more embodiments if the type of the connector is one of a video graphics array, a digital visual interface, a high-definition multimedia interface, and a display, then the GPU may be able to determine the EDID and may select the secondary color profile based on the EDID.

If the type of connector is one of a separate video (s-video), a composite video, or a component video, then the GPU may not be able to determine the EDID, the GPU may determine the secondary color profile based on one or more inputs received through a user interface coupled to the GPU. In one or more embodiments, operation 816 may involve replacing the default color profile of the secondary display with the secondary color profile. In one or more embodiments, operation 818 may involve reducing a difference of the color between the color of the image of the primary display with the primary color profile and the color of the image of the secondary display with the default color profile. In one or more embodiments, a type of a connector of another secondary display may be determined through the processor.

In one or more embodiments, an EDID of another secondary display may be determined based on the type of connector. In one or more embodiments, another secondary color profile may be determined to apply to image on the another secondary display. In one or more embodiments, the image with the another secondary color profile may be displayed on the another secondary display simultaneously as with the image on the secondary display such that the image on the another secondary display is similar at least in color to the image in the secondary display. The difference in color between the image with the secondary color profile and the image with the another secondary color profile may be reduced.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). Various operations discussed above may be tangibly embodied on a medium readable through operations on input and generation of output. These input and output operations may be performed by a processor. The medium readable may be, for example, a memory, a transportable medium such as a CD, a DVD, a Blu-Ray™ disc, a floppy disk, or a diskette. The medium may include instructions embodied therein. A computer program embodying the aspects of the exemplary embodiments may be loaded to the system. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Accordingly, the specification and drawings are to be regarded in an illustrative rather than a restrictive sense.

What is claimed is:

1. A method comprising:
displaying an image on a primary display associated with a primary color profile;
displaying the image on a secondary display associated with a default color profile, the primary color profile and the default color profile having a color discrepancy therebetween;
determining, through a processor, a type of connector of the secondary display and an extended display identification data (EDID) of the secondary display;
determining, through the processor, a secondary color profile based on the EDID from a database of color profiles; and
dynamically applying, through the processor, the secondary color profile to the image on the secondary display such that the image displayed on the primary display with the primary color profile matches with the image displayed on the secondary display with the secondary color profile.

2. The method of claim 1, further comprising:
querying the database through a driver of the processor; and
determining the secondary color profile, wherein the secondary color profile is one of a device dependent profile and a device independent profile, and wherein the device independent profile is a profile based on an international color standard.

3. The method of claim 1,
wherein the secondary color profile is of an extensible markup language format, and
wherein the type of the connector is one of a video graphics array, a digital visual interface, a high-definition multimedia interface, and a display port.

4. The method of claim 1, comprising:
selecting the secondary color profile based on an input through a user interface.

5. The method of claim 4,
wherein the user interface adjusts the image quality of the image, and
wherein the type of the connector is one of a separate video, a composite video, and a component video.

6. A system comprising:
a primary display to display an image associated with a primary color profile;
a secondary display to display the image with a default color profile, the primary color profile and the default color profile having a color discrepancy therebetween;
a database comprising a number of color profiles; and
a processor to determine a type of connector of the secondary display and an EDID of the secondary display, to determine a secondary color profile based on the EDID from the database of color profiles, and to dynamically apply the secondary color profile to the image on the secondary display such that the image displayed on the primary display with the primary color profile matches with the image displayed on the secondary display with the secondary color profile.

7. The system of claim 6,
wherein the secondary color profile is of an extensible markup language format, and
wherein the type of the connector is one of a video graphics array, a digital visual interface, a high-definition multimedia interface, and a display port.

8. The system of claim 6, further comprising:
a user interface to select the secondary color profile based at least one of a user input and the type of connector.

9. The system of claim 8,
wherein the user interface adjusts the image quality of the image, and
wherein the type of the connector is one of a separate video, a composite video, and a component video.

* * * * *